US007760896B2

(12) United States Patent
Medveczky

(10) Patent No.: US 7,760,896 B2
(45) Date of Patent: Jul. 20, 2010

(54) MICROPHONE MOUNT

(76) Inventor: Gabor Medveczky, 105 South St., P.O. Box 37, Barre, MA (US) 01005

( * ) Notice: Subject to any disclaimer, the term of this patent is extended or adjusted under 35 U.S.C. 154(b) by 1187 days.

(21) Appl. No.: 11/334,743

(22) Filed: Jan. 19, 2006

(65) Prior Publication Data

US 2006/0182301 A1 Aug. 17, 2006

Related U.S. Application Data

(60) Provisional application No. 60/644,532, filed on Jan. 19, 2005.

(51) Int. Cl.
*H04R 25/00* (2006.01)
*H04R 9/08* (2006.01)
*H04R 1/02* (2006.01)
*F16L 3/08* (2006.01)
*F16L 3/12* (2006.01)

(52) U.S. Cl. ....................... 381/189; 381/364; 381/388; D14/229

(58) Field of Classification Search .................. 381/91, 381/189, 361, 364, 366, 368, 385, 388; 248/74.1-74.4; D14/225, 229, 209.1, 215, 216, 227, 228
See application file for complete search history.

(56) References Cited

U.S. PATENT DOCUMENTS 3,651,286 A 3/1972 Gorike et al.
3,928,734 A 12/1975 Noury, Jr.
5,455,869 A 10/1995 Miscavige
6,578,805 B2 * 6/2003 Uchimura .................. 248/74.1
6,757,401 B2 6/2004 Uchimura et al.

OTHER PUBLICATIONS

Sony, ECM44B, Mar. 24, 2004, Sony Corp., p. 1 of 1.*
Location Sound Corporation, "Lavalier Mics & Accessories" *Sound Catalog*, North Hollywood, CA 91602, Chapter 13, pp. 57-66, © 2001: www.locationsound.com.

* cited by examiner

*Primary Examiner*—Curtis Kuntz
*Assistant Examiner*—Jesse A Elbin
(74) *Attorney, Agent, or Firm*—Edell, Shapiro & Finnan, LLC

(57) ABSTRACT

A mount assembly for a personal microphone is described. The mount assembly includes a spring-biased clip and a cage. The clip connects the assembly to an article of clothing. The cage is formed from an elongated bar made of rigid material. The bar is formed into a helix to define an enclosure that receives a microphone. The spirals of the helix may form a conical structure formed of spirals with increasing diameters. The cage may further include a base that secures the transmission cable of the microphone. The assembly protects the microphone from contact with objects, thus minimizes ambient and mechanical interference.

19 Claims, 3 Drawing Sheets

MICROPHONE MOUNT

CROSS REFERENCE TO RELATED APPLICATIONS

This application claims priority from U.S. Provisional Patent Application No. 60/644,532, entitled "Lavalier Microphone Isolation Mount" and filed Jan. 19, 2005. The disclosure of the above-mentioned provisional application is incorporated herein by reference in its entirety.

FIELD OF THE INVENTION

The present invention relates to a microphone isolation mount and, in particular, to a mount including a cage comprising spaced helical turns.

BACKGROUND

Microphones are electronic devices commonly used to amplify and record sounds. Microphones include a transducer covered by a grill or casing that permits sound vibrations to pass therethrough. The transducer, which converts the sound vibrations into electrical signals, transmits the signals to an amplifier. Typically, the amplifier is disposed at a remote location and, consequently, a microphone transmission cable is used to transmit the signals from the microphone to the amplifier. After being amplified, the electrical signals are then transmitted either to a receiver, where the signals are converted back into audible sound, or to a recording device, where the signals are recorded on magnetic tape or other similar material.

Handheld microphones are cumbersome since they require a user to hold the microphone near his/her mouth to be effective. In addition, audiences find handheld microphones visually distracting. Consequently, considerable effort has been expended to find ways to make microphones less conspicuous to audiences without sacrificing their utility. One approach is through the use of personal microphones such as "lapel" or "lavalier" microphones. Generally, a personal, lavalier microphone is a small microphone designed to be worn on a person's body.

While providing hands-free use, lavalier microphones are prone to isolation problems. Lavalier microphones can be omni or unidirectional, and typically pick up sound from multiple directions. As a result, they are highly susceptible to noise interference. Noise interference is that portion of sound output that is unintended and undesired. Interference most common to personal (lavalier) microphones is caused either by ambient interference (external inputs such as the rustling of clothing in the immediate vicinity of the microphone) or by mechanical interference (i.e., direct physical contact with the microphone itself). Thus, isolating the microphone from interference sources is critical in order to record clean audio.

Traditionally, lavalier microphones have been protected from ambient and mechanical interference by immobilizing the microphone using gaffer's tape. In one approach, tape is formed into a conical structure, which is then used to enclose the microphone. The adhesive side of the tape faces outward so that the cone adheres to the person. This approach is typically effective until the tape loses adhesion. Specifically, when the adhesive wears off, the cone becomes dislodged, conducting noises generated by tape rubbing against the wearer's clothing. The tape structure, moreover, is easily crushed by the actions of the user. The cone becomes crushed whenever the user makes any kind of movement where clothing is disturbed, such as sitting down, walking, or reaching, as well as when the user contacts the cone to adjust the microphone. When crushed, the inside surface of the tape rubs against the microphone, generating interference.

Another approach positions the microphone between pieces of tape. Specifically, two pieces of tape are each folded into a triangle, with the adhesive side exposed. The pieces are then secured to opposing sides of the microphone, and the microphone is adhered between layers of clothing. The tape serves to limit the relative movement between the microphone and clothing, thus minimizing unwanted noises. As with the above approach, this method is typically effective until the tape loses its adhesive property. Once this happens, clothing starts to rub against the tape and the microphone, creating interference. In addition, this configuration obstructs the microphone grill (since the microphone is sandwiched between the two pieces of tape); consequently, sound picked up by the microphone often becomes muffled. In other words, the tape hinders the microphone's ability to pick up the full range of sound.

A third approach is provided in U.S. Pat. No. 5,455,869, which discloses a device comprising a flat, shell-like design. This design suffers from several disadvantages. First, the design has a significant amount of surface area, which, in turn, blocks acoustic transmission and increases noise. Second, the device includes a series of intersecting bars that form right angles. The presence of right angles, corners, or other sharp transitions is prone to snagging clothing and, as such, generating interference. Third, the device is relatively complex structure, requiring hinges and grills.

Consequently, it would be desirable to provide a microphone mount assembly of simple design that secures a lavalier-type microphone to a user, maximizes the level of sound picked up by the microphone, and minimizes the effects of ambient interference and mechanical interference.

SUMMARY

The present invention comprises an assembly for mounting a microphone to an object (e.g., an article of clothing) in a manner that minimizes ambient and mechanical interference by shielding the microphone from external noise generation sources. The assembly includes a microphone enclosure and an optional connection member for securing the assembly to the object. The microphone enclosure comprises a bar including a plurality of helical turns that define a cavity. Preferably, the helical turns define a conical structure including narrow, open proximal end and a wide, open distal end. The microphone may be received within the cavity such that a gap exists between the microphone body and the interior surface of the cone. The connection member may comprise a clip that releasably engages an object such as an article of clothing. The microphone enclosure optimizes acoustic transmission reception, while minimizing noise caused by ambient and mechanical interference.

BRIEF DESCRIPTION OF THE DRAWINGS

Like reference numerals have been used to identify like elements throughout this disclosure.

DETAILED DESCRIPTION

Figure 1:
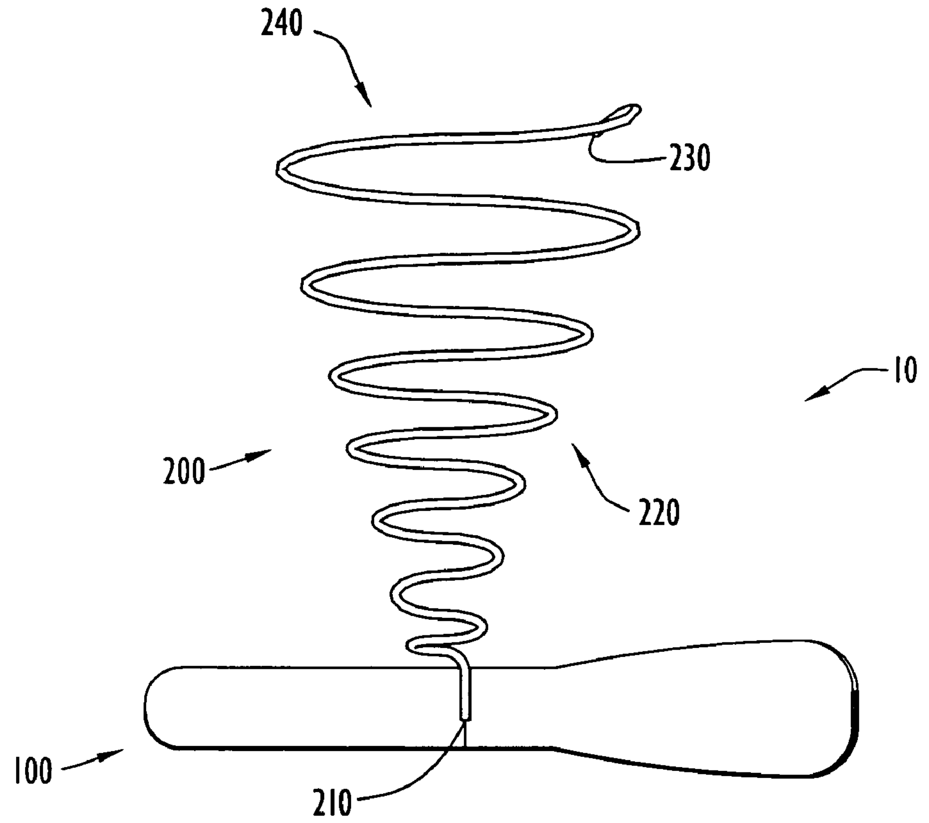
FIG. 1 illustrates a perspective view of the microphone mount assembly according to an embodiment of the invention.

In accordance with the present invention, a microphone mount assembly is configured to secure a personal microphone (e.g., a lapel or lavalier microphone) to an object such as an article of clothing, as well as to shield the microphone from undesired contact with the object. FIG. 1 illustrates a perspective view of the microphone mount assembly 10 according to an embodiment of the present invention. The assembly 10 may include a connection member 100 coupled to a microphone enclosure or cage 200. Any suitable manner of attachment may be used to couple the connection member 100 to the cage 200. For example, the cage 200 may be rigidly coupled to the connection member 100 (e.g., via welding), or may be pivotally coupled to the connection member 100 to permit the repositioning of the cage with respect to the connection member.

Figure 2:
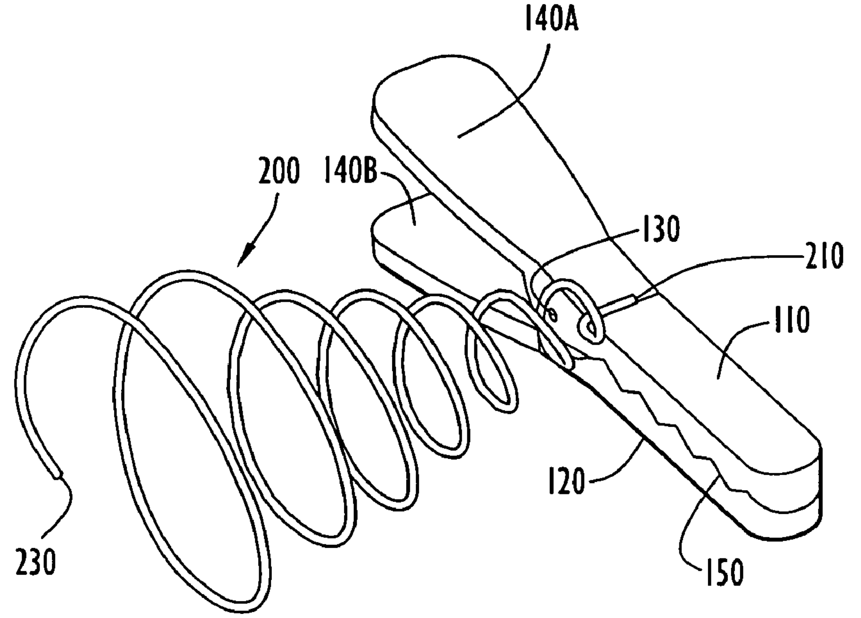
FIG. 2 illustrates a top perspective view of the microphone mount assembly of FIG. 1.

The connection member 100 comprises a structure configured to removably connect the microphone assembly 10 to an object such as an article of clothing. By way of example, the connection member 100 may comprise a clip that can be easily attached to and disengaged from an object. By way of further example, the connection member 100 may comprise a spring biased alligator clip. Referring to FIG. 2, this type of clip typically comprises a first arm 110 connected to a second arm 120 via a pivot pin 130. The distal or attachment ends of the arms 110, 120 are spring biased towards the closed position (the spring is not illustrated), and may be opened by compressing the proximal ends 140A, 140B of the arms 110, 120 toward each other. The distal end of the first arm 110 further includes teeth 150 configured to interlock with teeth 150 similarly disposed on the second arm 120. The engaged teeth 150 securely grip an object and connect the microphone assembly 10 thereto. It is important to note that a number of suitable connectors other than a clip may be used to attach the assembly 10 to an object. Other suitable articles include, but are not limited to, clasps, magnets, adhesives, pins, hooks, screws, snaps, and hook-and-loop fasteners.

The cage 200 comprises a structure operable to receive and hold a personal microphone, as well as to prevent objects from contacting the microphone. The material comprising the cage 200 is not limited and, preferably, the cage 200 is formed from rigid material. By way of example, the cage 200 may be made from metal (e.g., steel, aluminum, copper, etc.), rigid plastic, etc. When metal is used to form the cage 200, it may be further treated to minimize its coefficient of friction (to minimize pulling/snagging between the cage and clothing). For example, the metal may be coated with a plastic or silicone. Referring back to FIG. 1, the cage may comprise a single, elongated bar or wire including a proximal end 210, an intermediate portion 220, and a distal end 230. The bar is of sufficiently heavy gauge to retain the desired shape of the cage 200 once formed. The diameter of the bar may include, but is not limited to, a range of about 1 mm to about 10 mm, and preferably of about 1 mm to about 5 mm. Preferably, the bar includes a rounded cross section to minimize contact area and resulting friction between the bar and the user's clothing.

The proximal end 210 is oriented perpendicular to the connection member 100, and is attached to the connection member as described above. The intermediate portion 220 extends distally from the proximal end 210 toward the distal end 230. The intermediate portion 220 comprises a plurality of spaced helical curves or turns. The turns may have successively increasing diameter, forming a helical cone having an open narrow proximal end and an open wide distal end. These curves form a series of rings that define a cavity or channel 240 operable to receive a microphone having an acoustic transducer end disposed proximate the distal open end of the cone. Each ring or curve is spaced apart from adjoining rings to maximize acoustic transmission traveling through cage, as well as to minimize the level of noise interference (sound muffling) that would occur with a microphone completely encased in an enclosure. The number, dimensions, and spacing of the curves are not particularly limited, and may be adjusted for microphones of various dimensions. The cage, moreover, may be contoured to receive one or more differently configured microphones. For example, the generally helical shape described above may be flattened into an oval shape, which is more suitable for receiving a flat microphone.

Figure 3:
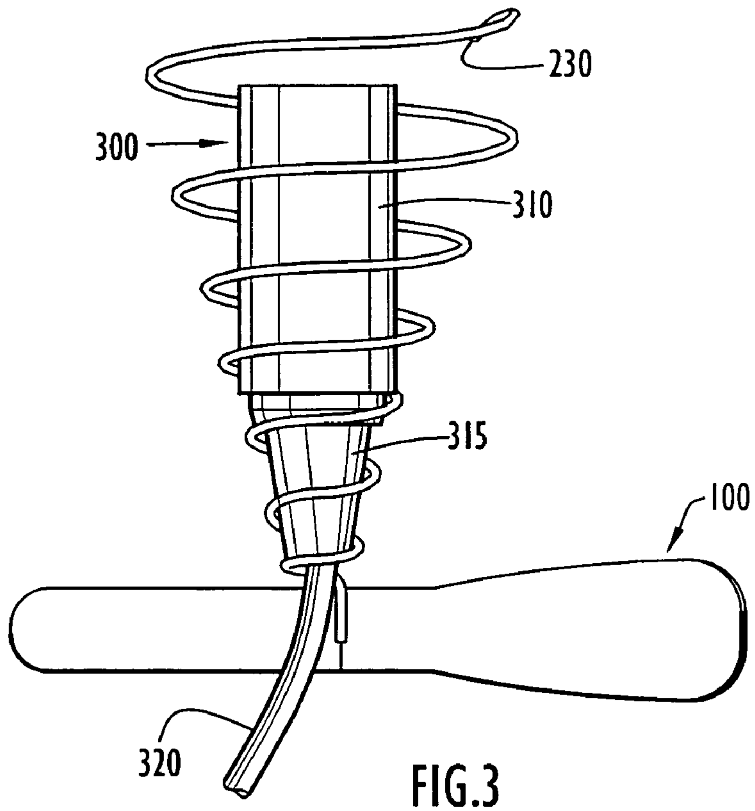
FIG. 3 illustrates a perspective view of the microphone mount assembly of FIG. 1, showing a personal microphone positioned within the assembly.
Figure 4:
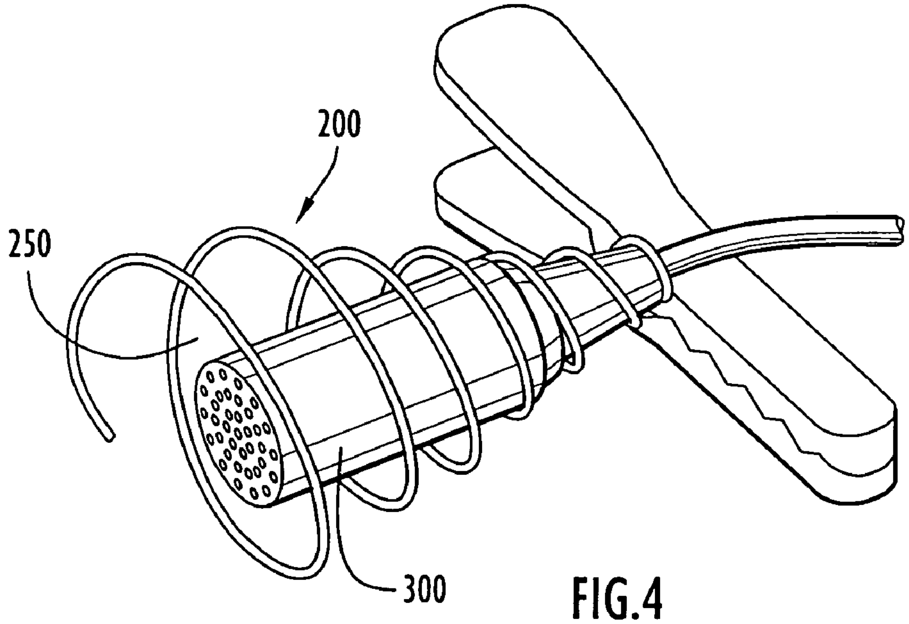
FIG. 4 illustrates a top view of the microphone mount assembly of FIG. 3.

Referring to FIGS. 3 and 4, a microphone device 300 comprising a body portion 310, a base portion 315, and a transmission cable 320 connected to the base portion 315. The body portion 310 includes the acoustic transducer, which receives acoustic transmissions. As illustrated, the device 300 is received within the cavity 240 defined by the helical turns of intermediate portion 220. As best seen in FIG. 4, the diameter of the cavity 240 (thus of the rings forming the upper section of the cavity) may be larger than the diameter of the microphone body 310 to create a generally annular gap 250 between the perimeter of the microphone body and the interior surface of the intermediate portion 220. This gap 250 provides a physical offset or space around the microphone body 310 to isolate the microphone from outside interference caused by contact with clothing. That is, fibers from clothing cannot contact with the microphone because there is a sufficient distance created between the microphone and outside elements by the offset. In addition, since the cavity 240 is narrower along the proximal end of the cage, the base portion 315 of the microphone 300 rests on the proximal end rings. This stabilizes and secures the microphone within the cage 200, preventing its movement within the cavity 240.

Figure 5:
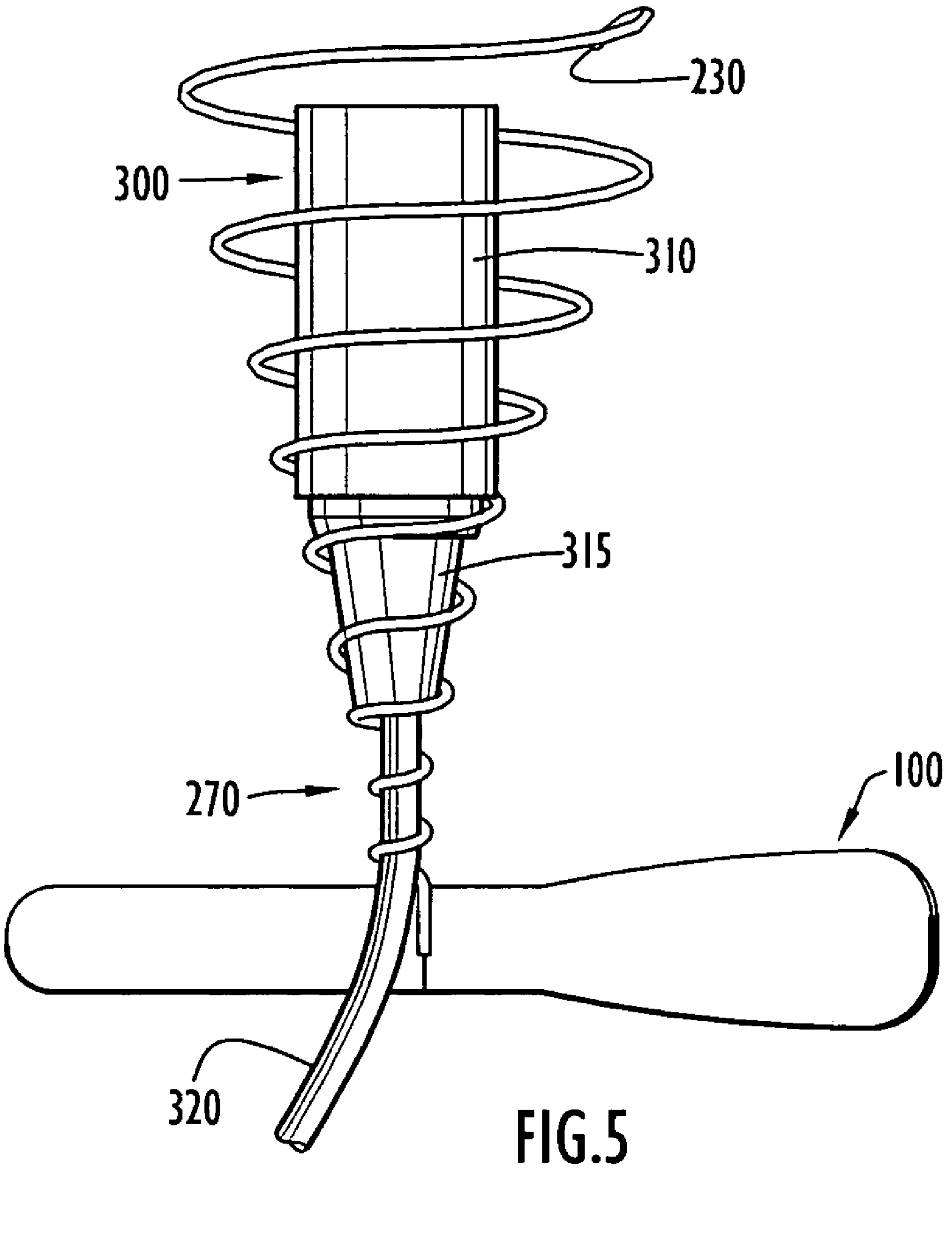
FIG. 5 illustrates a perspective view of the microphone mount assembly according to another embodiment of the invention.

Referring to FIG. 5, the cage 200 may further include a base section 270 configured to receive the cable portion 320 of the microphone 300. As shown in FIG. 1, the base 270 is disposed between the cone open proximal end and the proximal end of the bar 210 (i.e., it is disposed distally of the bar proximal end 210). The base 270, formed integrally with the bar, is adapted to receive the transmission cable 320 of the microphone 300 or to permit the passage of an antenna therethrough (not illustrated). For example, as shown in FIG. 3, the base 270 of the intermediate portion 220 may include dimensions sufficient to receive the transmission cable 320 of the microphone device 300. Similar to the intermediate portion, the base may comprise a series of spaced helical curves. The curves may define a cavity having a radius comprising a relatively constant diameter. The diameter of the base may include, but is not limited to, a range of about 2 mm to about 10 mm.

In addition, the base 270 may include dimensions slightly smaller than that of the cable 320 to compress the cable slightly and capture it therein. Cables typically comprise covers made of compressible materials such as rubber or plastic. Thus, the turns of the base 270 may be sized to have a diameter slightly smaller than that of the microphone cable 320. These smaller diameter turns create a mild compression bond between the outside cover of the microphone cable 320 and base thereby locking the microphone 300 within assembly 10. As a result, any stress placed on the cable 320 may be diffused by the base 270 and dissipated, reducing damage caused by strain to the microphone cable 220 due to pulling.

The distal end 230 of the bar may be bent inward such that it is positioned over the cage 200, toward the opening of the cage 200. In addition to serving as a distal stop (preventing the microphone from falling out of the cage), this bent configuration prevents clothing from snagging on the tip of the distal end 230. The tip of the distal end 230, moreover, may be treated to eliminate snagging or scraping that could occur should the distal end 230 come in contact with clothing. For example, a smooth bead of plastic or solder (not shown) may be attached to the tip.

The operation of the microphone mount assembly 10 is explained with reference to FIGS. 1-5. A personal microphone 300 is connected to the mount 10 by inserting the microphone cable 320 through the distal end of the cage 200 and, in particular, between adjoining rings at the distal end of the cone. The cable 320 is led through the helical turns of the intermediate portion 200 using a spooling motion. Once the cable 320 reaches the bottom of the intermediate portion 220 (or the base 270 if present), the microphone 310 is axially drawn into the cavity 240 until the bottom of the microphone body 310 (where the microphone body 310 connects to the cable 320) contacts the proximal end of the intermediate portion 220. Since the intermediate portion 220 of the cage 200 comprises a conical structure, the rings oriented along the proximal end of the cage posses a diameter smaller than those along the distal end of the cage. As a result, the proximal end rings serve as a stop, engaging the bottom of the microphone body 310 and preventing further axial movement of the microphone body 310 towards the cage proximal end.

The cable 320 is then positioned within the base 270 by leading the cable through the curves. As noted above, the diameter of the base cavity may be slightly smaller than the diameter of the cable 320; consequently, a mild compression bond between the cable 320 and base 270 is created, thereby locking the microphone 300 into the assembly 10. The assembly 10 may then be clipped onto an article of clothing by engaging the connection member 100. Specifically, of the arms 110, 120 of the connection member 100 are compressed along their proximal ends 140A, 140B, opening the teeth 150. The article of clothing is positioned between the teeth 150, and the arms 110, 120 are released, causing the teeth to engage the article of clothing and secure the microphone mount assembly 10 thereto.

The disclosed microphone mount assembly 10 serves to eliminate three problems that can occur when concealing microphones under clothing. First, it protects against rubbing against the microphone that can be created from microphone contact with clothing or skin. Second, it eliminates sound muffling and distortion that occur when enclosing the microphone in a protective enclosure such as tape. Last, it protects the microphone against crushing and damage. The shape and material of the microphone mount further reduce the remaining contact noise. The shape of the microphone mount is made up of smooth and continuous conical and circular sections which reduce the number of sharp or discrete intersections such as right angles that can introduce noise by scraping against the subject or clothing. The material of the mount further reduces the noise by using thin metal wire which has a diminished surface area. Since, smaller surface areas introduce less noise, surface areas should be minimized. The bar also has a very smooth surface, which eliminates unwanted noise by reducing drag.

While the invention has been described in detail and with reference to specific embodiments thereof, it will be apparent to one skilled in the art that various changes and modifications can be made therein without departing from the spirit and scope thereof. For example, the size of the cage 200 is not limited, and may be adapted to accommodate personal microphones (lavalier microphones) of various sizes. Though the conical shape is preferred, the shape of the cage 200 may be contoured to support microphones of various shapes (cardioid shaped, microphones with elongated bases, etc.). Similarly, the base 270 may comprise any size and shape suitable for its intended purpose. The base 270 may be contoured to secure cables 320 of various shapes and sizes, as well as permit antennae of various configurations to pass therethrough. Thus, it is intended that the present invention cover the modifications and variations of this invention that come within the scope of the appended claims and their equivalents. For example, it is to be understood that terms such as “first”, “second”, “proximal”, “distal”, “left”, “right” “top”, “bottom”, “front”, “rear”, “side”, “height”, “length”, “width”, “upper”, “lower”, “interior”, “exterior”, “inner”, “outer” and the like as may be used herein, merely describe points of reference and do not limit the present invention to any particular orientation or configuration.

I claim:

1. A microphone mount assembly comprising:

a connection member operable to removably connect to an object; and a microphone enclosure comprising a bar extending distally from the connection member, the bar including a proximal end coupled to the connection member and a distal end spaced above the connection member, wherein the bar comprises a plurality of spaced helical turns that form a cage having an open proximal end and an open distal end, the cage defining a cavity configured to receive and hold a microphone, wherein the helical turns are spaced axially along the cage, and wherein the turns possess successively increasing diameters from the cage proximal end to the cage distal end such that the cage proximal end opening is narrower than the cage distal end opening and the enclosure defines a generally helical cone.

2. The microphone mount assembly of claim 1 further including a microphone housed within the cage, wherein:

the microphone includes a microphone base and a body having a perimeter; and the distal portion of the cage is configured such that it is radially surrounds the microphone body perimeter to form a generally annular gap between the microphone body perimeter and the cage, isolating the body of the microphone to prevent contact of the microphone body with the object.

3. The microphone mount assembly of claim 2, wherein the cage further includes a stop disposed within an opening that prevents removal of the microphone from the cage.

4. The microphone mount assembly of claim 1, wherein a distal portion of the bar is bent at its distal end such that the bent portion is positioned directly above the cavity to form a stop that prevents axial removal of the microphone from of the cage.

5. The microphone mount assembly of claim 1, wherein the enclosure further comprises a base comprising a plurality of spaced helical curves having a generally constant diameter.

6. The microphone mount assembly of claim 1, wherein the helical turns are spaced such that a gap exists between adjacent turns, the gap permitting the transmission of sound therethrough.

7. The microphone mount assembly of claim 1, wherein the object to which the connection member connects is an article of clothing.

8. The microphone mount assembly of claim 1, wherein the bar comprises rigid material.

9. The microphone mount assembly of claim 1, wherein said connection member is a spring-biased clip.

10. The microphone mount assembly of claim 9, wherein clip is pivotally coupled to the microphone enclosure.

11. The microphone mount assembly of claim 1, wherein the microphone enclosure further includes a base formed integrally with the cage, the base comprising one or more helical turns that define a base cavity operable to receive a microphone cable.

12. The microphone mount assembly of claim 1, wherein the bar possesses a generally round cross section.

13. The microphone mount assembly of claim 12, wherein the bar comprises a diameter of about 1 mm to about 10 mm.

14. The microphone mount assembly of claim 1 further comprising a personal microphone disposed within the cage such that the microphone is received completely within the enclosure.

15. A method of protecting a personal microphone device comprising:

providing the microphone mount assembly according to claim 1;

providing a personal microphone device including a microphone body and a transmission cable;

inserting the transmission cable into the helical curves; and drawing the microphone device through the open distal end and positioning the microphone body within the enclosure.

16. The method of claim 15, wherein the mounting assembly further includes a connection member operable to attach the assembly to an object, and the method further includes connecting the assembly to the object via the connection member.

17. A microphone kit comprising:

a microphone mount assembly including:

a connection member configured to attach the assembly to an object, and a microphone enclosure comprising a bar extending distally from the connection member, the bar including a proximal end coupled to the connection member and a distal end spaced above the connection member, wherein the bar comprises a plurality of spaced helical turns that form a cage having an open proximal end and an open distal end, the cage defining a cavity configured to receive and hold a microphone, wherein the spaced helical turns possess successively increasing diameters from the cage proximal end to the cage distal end such that the cage proximal end opening is narrower than the cage distal end opening and the enclosure generally defines a cone; and a microphone axially received within the enclosure, the microphone comprising a base and a body housing an acoustic transducer, wherein:

the body defines a perimeter, and the microphone is axially received in the cage and seated such that at least a portion of the cage is radially spaced from the perimeter of the microphone body to form a generally annular gap between the perimeter of the microphone and the cage, isolating the body of the microphone and preventing contact of the microphone body with the object.

18. The microphone kit of claim 17, wherein the microphone body is completely received within the enclosure.

19. The microphone kit of claim 18, wherein the cage further includes a stop positioned over the body that prevents removal of the microphone from the cage.

* * * * *